Jan. 4, 1938.                H. C. HILL                2,104,590
                       FLUID METERING DEVICE
                       Filed Nov. 29, 1935
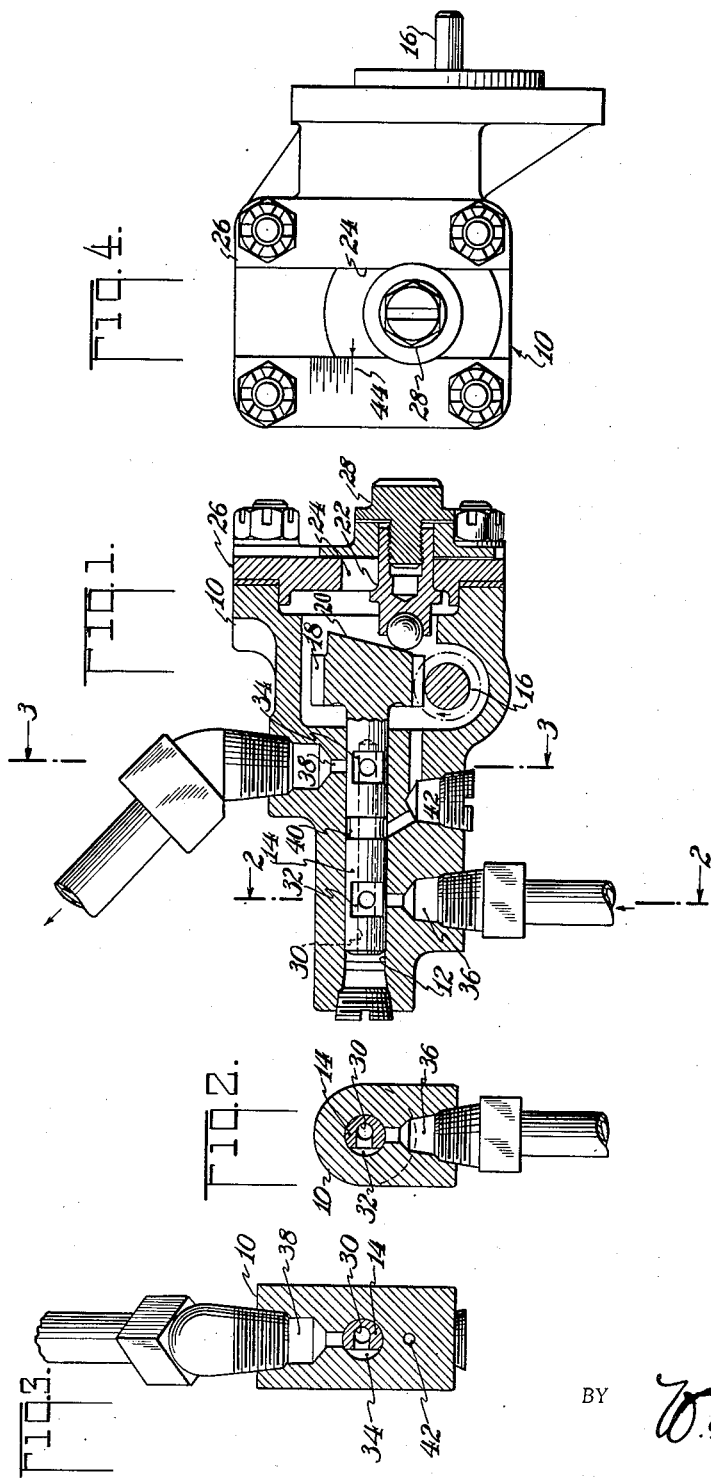
INVENTOR.
HENRY C. HILL
BY
ATTORNEY.

Patented Jan. 4, 1938

2,104,590

UNITED STATES PATENT OFFICE 2,104,590

FLUID METERING DEVICE

Henry C. Hill, Paterson, N. J., assignor to Wright Aeronautical Corporation, corporation of New York Application November 29, 1935, Serial No. 52,043

6 Claims. (Cl. 103—157)

This invention relates to fluid metering or pumping devices in general and to an improved form of controlled quantity lubricator in the specific embodiment of the showings.

Objects of the invention are to provide an improved and simplified device which will give a controlled and adjustable delivery. Associated objects are to minimize the effects of leakage whereby accurate adjustment of the quantity delivered may be had without recourse to very fine fits in the metering mechanism.

In the drawing:

Fig. 1 is a longitudinal section through the device;

Fig. 2 is a section on the line 2—2 of Fig. 1;

Fig. 3 is a section on the line 3—3 of Fig. 1; and

Fig. 4 is an end view of the right hand side of Fig. 1.

The device consists of a body or housing 10 having a bore 12 in which is slidably and rotatably mounted a plunger 14 suitably driven, as by the helical gear 16 engaged with a mating gear 18 comprising a head for the plunger 14. The end of this head is provided with an oblique cam face 20 engaging a ball ended abutment stud 22 which is radially adjustable in a slot 24 formed in a cover 26, the adjusted position of the abutment stud 22 being secured by the cap nut 28. The plunger is provided with an axial hole 30 and with flats 32 and 34 which are in communication with this axial hole. The housing is provided with an inlet port 36 and an outlet port 38 cooperating respectively with the flats 32, 34. The inlet hole 36 is connected to a source of oil supply, preferably under pressure, and the outlet 38 is connected to the part or parts to be lubricated by suitable pipe connections (not shown).

Intermediate the flats 32, 34 the plunger is provided with a circumferential draining groove 40 communicating with the drainage port 42. The operation of the device is as follows:

Rotation of the driving helical gear 16 causes the plunger 14 to rotate and to reciprocate by the action of the angular cam face 20 against the abutment stud 22. The inlet flat 32 is so timed as to place the bore 12 in communication with the inlet port 36 during the recessional or out stroke, whereby oil pump pressure is available on the plunger to maintain the cam 20 in contact with the stud 22. The helix direction of the gears 16 and 18 is organized so as to constantly draw the plunger 14 outward so that its oblique face 20 is held in engagement with the stud 22. During this time the end of the bore 12 is filled with oil and during the succeeding half revolution the inlet port 36 is shut off by the passage of its flat 32 by the port, while communication is established by the flat 34 with the outlet port 38, and the inward stroke of the plunger delivers a predetermined quantity of oil. In the position shown, the plunger is at the outermost end of its stroke.

The drainage groove 40 and port 42 serve to interrupt leakage of any oil along the plunger toward the outlet port and deflect this oil to the gear housing for the lubrication of the gears, whereby the pressure is vented and leakage into the outlet port 38 past the plunger is avoided, whereby the plunger does not require the extremely close fitting which has been a source of expense and seizure in the devices of prior art. By radially adjusting the abutment ball 22 towards the plunger axis by means of the cap nut 28 the stroke and displacement of the plunger may be reduced to any desired adjustment. The cover 26 may be conveniently graduated with a scale 44 calibrated to indicate the quantity delivered.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A metering pump including a closed end cylinder having axially spaced inlet and delivery ports, a plunger having valving openings cooperating with said ports and communicating with said closed end, and means to rotate and reciprocate said plunger said plunger including a head having an oblique face, and a radially adjustable abutment engaged with said face.

2. A metering pump including a closed end cylinder having axially spaced inlet and delivery ports, a plunger having valving openings cooperating with said ports and communicating with said closed end, means to rotate and reciprocate said plunger, said plunger including a head having an oblique face, a radially adjustable abutment engaged therewith, and means to maintain said face in engagement with said abutment.

3. In a pump comprising a cylinder and a plunger mounted for rotation and reciprocation therein, a head on said plunger having a face oblique to the plunger axis, means for rotating said plunger, and an abutment adjustable radially of said head against which said face is adapted to bear whereby, by radial abutment movement the plunger stroke may be varied.

4. In a pump comprising a cylinder and a plunger mounted for rotation and reciprocation therein, said cylinder having axially spaced inlet and exit ports and said plunger having interconnected and axially spaced ports for timed registry with said cylinder ports, respectively, said interconnection communicating with said cylinder and the ports in the cylinder or in the plunger being out of axial alignment, means for turning said plunger, and means to reciprocate said plunger in response to turning thereof, comprising a plunger head having an oblique face, and an abutment against which said face is adapted to bear, said abutment being substantially radially adjustable relative to said plunger face.

5. A pump comprising a closed end cylinder having diametrically opposed, axially spaced ports therein, a hollow plunger rotatable and reciprocable in said cylinder, having axially alined ports each for timed registry with said cylinder ports, said plunger hollow communicating with said cylinder and with the plunger ports, and means for rotating and reciprocating said plunger to effect sequential registry, first, between one said cylinder port and one said plunger port, and then, between the other said cylinder port and the other said plunger port, said rotating and reciprocating means including an oblique faced head on said plunger, and a radially adjustable abutment bearing on said face.

6. A pump comprising a cylinder and a plunger reciprocable and rotatable therein, said plunger having a finite mid-position of reciprocation, means for varying the plunger stroke substantially equally on either side of said mid-position comprising a plunger head having an oblique face, and a radially adjustable abutment, contacting said face, having a consistent axial position such that, when the abutment is in zero plunger stroke position the plunger occupies the said mid-position of reciprocation.

HENRY C. HILL.